May 24, 1938.  R. R. EASTIN  2,118,178
TRANSMISSION MECHANISM
Original Filed March 31, 1936   2 Sheets-Sheet 1
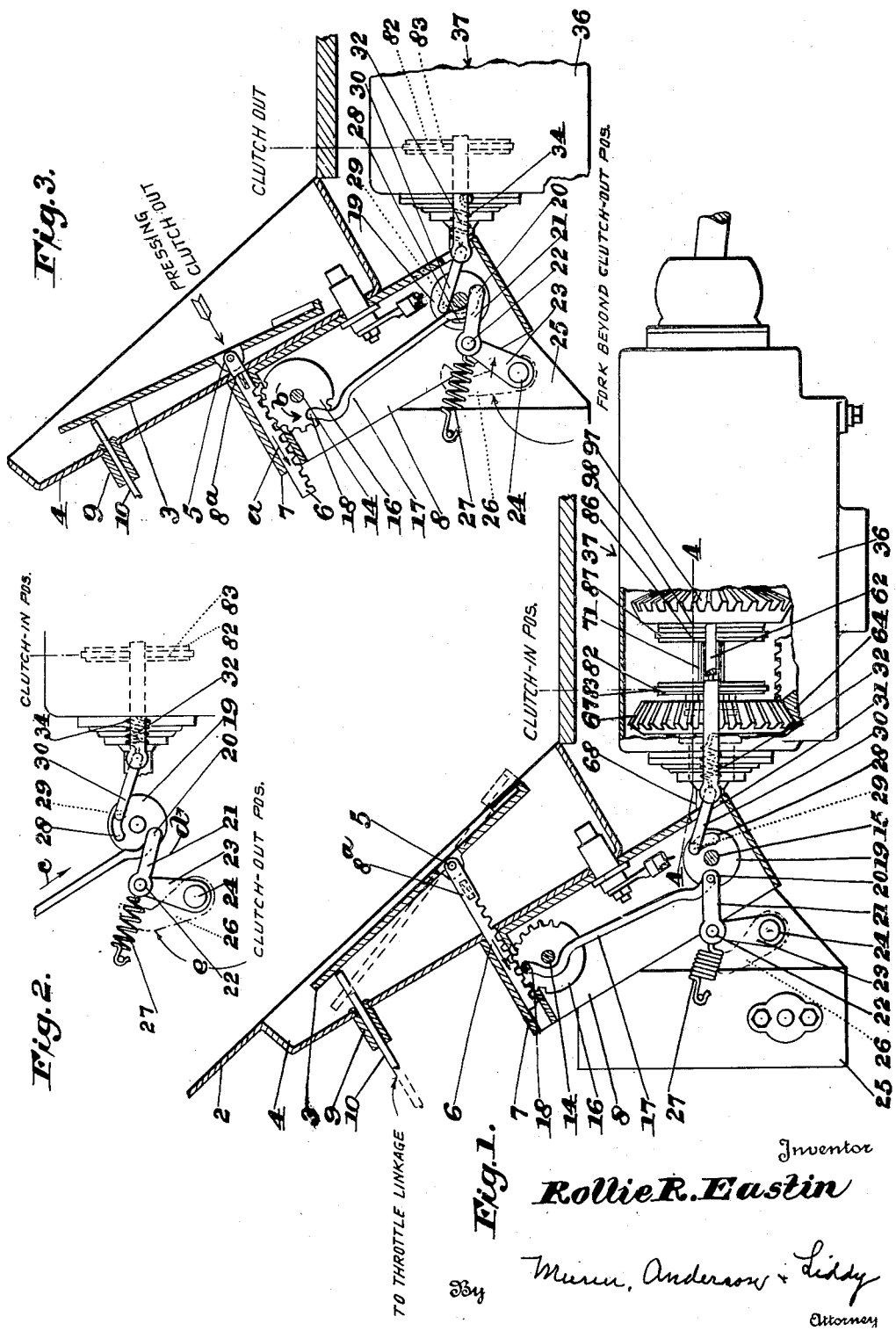

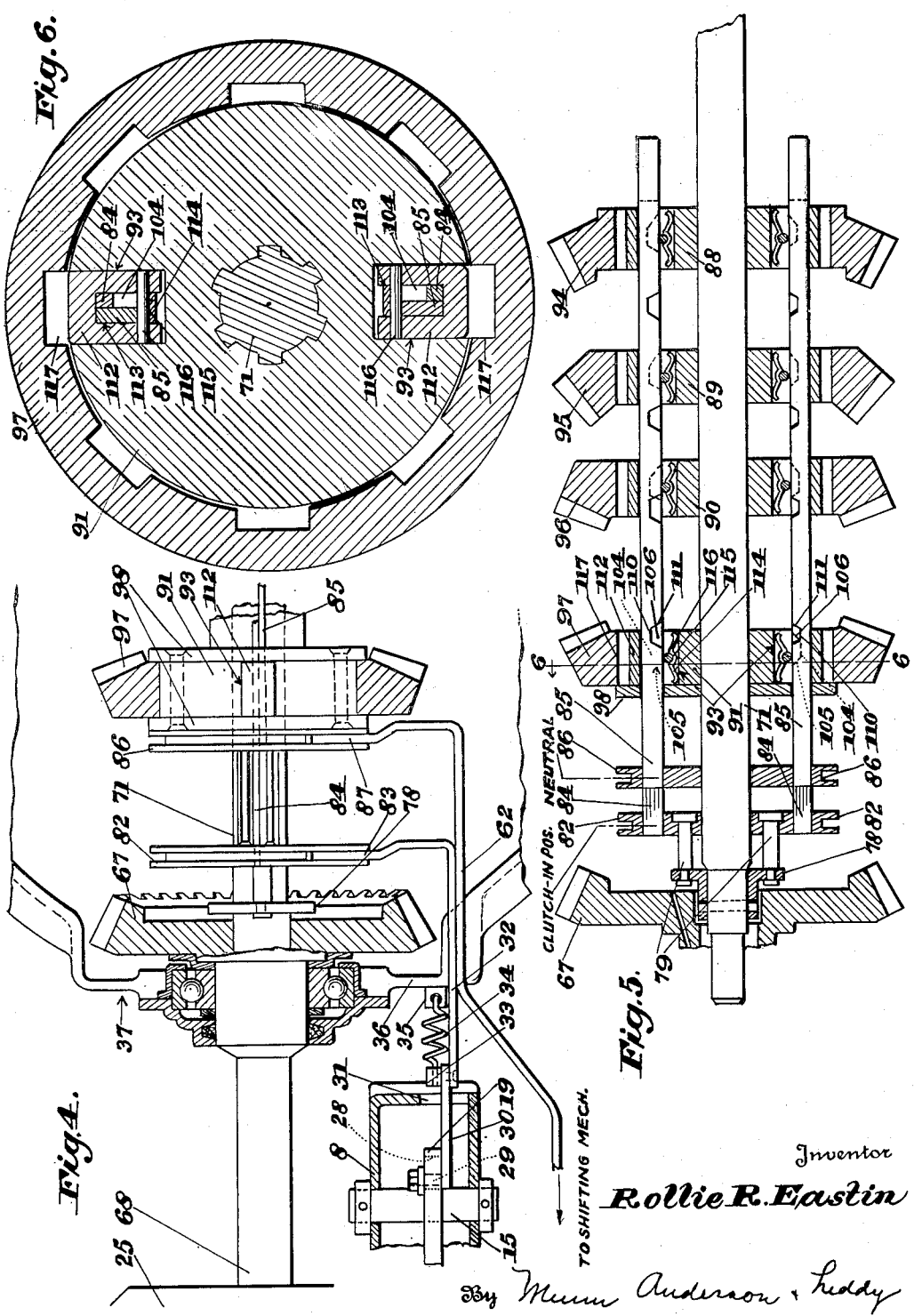

Patented May 24, 1938

2,118,178

UNITED STATES PATENT OFFICE 2,118,178

TRANSMISSION MECHANISM

Rollie R. Eastin, Port Huron, Mich., assignor of five percent to Jesse C. Castator and Loretta Castator, ten percent to Walter Burns, ten percent to Robert A. Gray, Jr., ten percent to William Burns, and fourteen percent to Reginald Smith, all of Port Huron, Mich.

Original application March 31, 1936, Serial No. 71,915. Divided and this application November 3, 1936, Serial No. 109,048

8 Claims. (Cl. 192—.01)

This invention relates to improvements in transmission mechanisms, and its objects are as follows:

First, to provide for the combined control of the accelerator, clutch and transmission of a motor vehicle.

Second, to place the clutch and accelerator under the control of one pedal so that the driver has only two pedals to operate, namely the clutch and brake.

Other objects and advantages will appear in the following specification, reference being had to the accompanying drawings in which:

Figure 1 is a combined sectional and elevational view of the structure involved in the invention.

Figure 2 is a detail view showing the clutch-out position of certain linkage later described.

Figure 3 is a sectional view of the combined clutch and accelerator pedal together with related structure.

Figure 4 is a fractional horizontal section taken on the line 4—4 of Fig. 1.

Figure 5 is a diagrammatic sectional view illustrating the neutralization of the speed-change gear locking means.

Figure 6 is a cross section taken on the line 6—6 of Fig. 5.

This application is a division of an application for patent for transmission mechanism filed by Rollie R. Eastin March 31, 1936, Serial #71,915. As already indicated, the foremost purpose of the instant structure is to provide for the combined control of the accelerator, clutch and transmission. Only those portions of the structure in the above application that are necessary to the understanding of the divided subject matter are herein disclosed.

In Fig. 1 the sloping foot-board 2 is pocketed at 4 to contain the clutch pedal 3. When said pedal is in its idle position (Fig. 1) it is substantially flush with the foot-board 2 so that the driver can readily slip his foot onto it preparatory to pressing it down (Fig. 3). A pivot pin 5 turnably connects the clutch pedal with a rack bar 6. This rack bar is movable up and down in the guide 7 of a casing 8 which is appropriately fixed upon the vehicle. A slip-joint 8a in the rack bar enables the removal of the pedal when it is desired to lift the foot-board.

The casing 8 has a bushing 9 attached to it for the guidance of a rod 10 which projects into the pocket at one end, its other end extending off to the linkage of the carburetor (not shown). Said rod and the unshown linkage are herein identified as the accelerator, it being plain that the rod 10 only lacks the customary separate pedal to make the identity complete. However, said customary pedal is dispensed with, and the clutch pedal is made to serve two purposes in that it controls both the accelerator and the rack bar 6, the latter being identified with the clutch as is brought out below.

A pair of shafts 14, 15 is journalled on the sides of the casing 8. The top shaft 14 carries a gear 16, which may be fractional as shown, in mesh with the rack bar 6. A depression of the clutch pedal 3 moves the rack bar downwardly (arrow a, Fig. 3) and turns the gear counter-clockwise (arrow b).

A link 17 is pivotally connected to the gear 16 at 18 and extends to a disk 19 on the bottom shaft, to which disk the link is pivoted at 20 in common with another link 21 that extends across to where it is connected at 22 to an arm 23. This arm is secured to one end of the clutch fork shaft 24. Said shaft is journalled on the clutch housing 25, and one end of it projects from the housing to receive the arm.

On the inside of the housing 25 the shaft 24 carries the clutch fork 26. The operation here is on such an order that when the clutch pedal 3 is depressed as stated (Fig. 3) the linkage so far described moves in the direction of the arrows c and d (Fig. 2), turning the arm 23 in the direction of the arrow e and causing the clutch fork 26 to displace the clutch (not shown) into the clutch-out position. A strong spring 27, anchored at one end to the housing 25 (Fig. 1) and connected at the other end to the pivot 22, tends to resist the movements in the directions of the arrows (Fig. 2), and aids in restoring the parts to an original position when foot pressure on the clutch pedal 3 is relaxed.

A slot 28 in the disk 19 contains the stud 29 (Fig. 4) of a link 30 which extends rearwardly through an opening 31 in the casing 8 to a place of pivotal connection with the transmission release bar 32. Said pivotal connection comprises a stud 33 (Fig. 4) which is riveted to the bar 32. It provides an anchorage for one end of a spring 34, the opposite end of which is attached to a lug 35 on the bottom portion 36 of the transmission housing 37. The springs 34, 27 work together in restoring the foregoing parts to said original position when the pedal 3 is released.

The purpose of the slot 28, which is arcuate as shown, is to allow an initial movement of the linkage 17, 21 and arm 23 before the link 30 is affected. The stud 29 initially occupies a position at the upper end of the slot 28 (Fig. 1). Depression of the clutch pedal 3 advances the slot 28 with respect to the stud 29 (Fig. 2). The engagement of the lower end of the slot with the stud marks the beginning of a pull on the link 30 upon further depression of the clutch pedal. In the meantime the fork 26 disengages the clutch.

A shifting mechanism is disclosed in the original application for the purpose of producing any one of the following conditions in the speed-change gears: first, second and third speeds, reverse and neutral. The details of this mechanism are thought non-essential here, hence are not shown, it being sufficient to understand that when said mechanism is manipulated, back and forth motion is imparted to the shifting bar 62 (Figs. 1 and 4). This bar, like the transmission release bar 32, extends into the transmission housing 37.

Only the largest 64 (Fig. 1) of three transmission drive gears in the housing 37 is shown. Driving power is applied to this gear and to the unit which the three represent, by a drive pinion 67 which is fixed on the adjacent end of the drive shaft 68. The drive shaft extends forwardly into the clutch housing 25 where it is subject to the clutch as already pointed out.

The splined driven shaft 71 is an inherently unconnected continuation of the drive shaft 68. It occupies a position in the housing 37, and carries a circular flange 78 (Fig. 5) from which two or more headed guide studs 79 project rearwardly in parallelism to each other and to the driven shaft. An assemblage of disks, collars and gear centers is mounted on the splines of the driven shaft.

The first one of a pair of disks on said shaft (Figs. 1 and 5) is the transmission release disk 82. This has an annular groove to contain the forked end 83 of the transmission release bar 32 (Fig. 4). The function of this bar, upon the depression of the clutch pedal 3, is to shift the disk 82 from the clutch-in position (Figs. 1 and 5) to the clutch-out position (Fig. 3). This disk has only the two positions. Said disk is further mounted on the studs 79 which provide its guidance as said disk is moved between said positions.

Each of a pair of gear release bars 84 is permanently secured at its left end in the disk 82 (Fig. 5). These bars are diametrically opposite to each other, and they lie flat against a pair of shifter bars 85 which begin at the second one of said pair of disks, namely the shifter disk 86. The latter disk is annularly grooved to contain the fork 87 (Fig. 4) of the shifting bar 62. When the shifting bar is moved by operation of the aforesaid shifting mechanism, the disk 86 will take any one of the five possible positions previously mentioned. Its range of movement is from the extreme right position in Fig. 1 (which happens to be the 3rd-speed position), to one more step to the left in Fig. 5 which would be the reverse position. Then it would be directly beside the disk 82, but the heads of the studs 79 act as limiting means, stopping the disk 86 when moved into the reverse position.

Four gear centers 88, 89, 90, and 91 are fixed upon the driven shaft 71 (Fig. 5). The gear centers carry the 3rd-speed, 2nd-speed and 1st-speed gears 94, 95, and 96 and the reverse gear 97 in the order indicated. These are the speed-change gears previously mentioned. Since all of the gears and their centers are alike in structure, it is just as convenient to confine the detail description to the reverse gear as to any other.

The gear center 91 is peripherally smooth-faced (Fig. 6) with the exception of key recesses 93 at diametrically opposite points (Fig. 5). The reverse gear 97 is a ring gear, as are the others, the central opening being large enough to contain the gear center 91 with a turning fit. Said gear and its center comprises a set, and they are kept that way by facing plates 98 which are riveted to the opposite sides of the center 91.

The reverse gear and its center are momentarily digressed from to consider the details of the gear release bars 84. Each bar extends from the disk 82 through the disk 86, all of the gear centers and all of the facing plates, projecting a considerable distance beyond the last of the latter (Fig. 5). Each gear release bar has notches on its inner side, the ones concerned with the reverse gear 97 being designated 104. The notches in the two bars are in confronting relationship. Each notch is rather long, having an abrupt end 105 and a long incline 106, respectively at the left and right.

The shifter bars 85 also have notches on their inner sides, the ones concerned with the reverse gear 97 being designated 110. Both ends of these notches are abrupt as at 111. The two sets of notches 104, 110 are adapted to be brought into registration by a release of the clutch pedal 3, which results in the movement of the disk 82 to the clutch-in position (Fig. 5), following the adjustment of the shifting mechanism to neutral.

Now returning to the reverse gear and its center, the latter contains a key 112 (Fig. 6) in each of its recesses 93. These keys are in the form of a U so as to provide an internal spring and bar space 113. A heavy leaf spring 114 extends into the respective space, its free end resting on the bottom of the recess, and the crotch 115 in its mid portion constantly bearing against a cross pin 116 in the key because of the spring tension.

The gear release and shifter bars 84, 85 occupy the space 113 constantly, the keys being radially movable with respect thereto, first inwardly of the recesses 93 in the gear center then outwardly into any diametrical pair of recesses 117 (Fig. 6) in the reverse gear 97 so as to lock said gear and its center together. The keys 112 then occupy both sets of recesses in the gear and its center, bridging the dividing line therebetween to do the locking.

A further and the chief purpose of the cross pins 116 is to cooperate with the notches 104, 110 in the bars 84, 85. When these notches are brought into registration as stated above, the springs 114 press the keys 112 into the recesses 117. Later, when the bars 84 are shifted relatively to the bars 85 to the clutch-out position the movement of the inclines 106 across the pins 116 moves the latter inwardly to retract the keys 112 from the recesses 117. This releases the rotating reverse gear 97 from its center 91, leaving the latter and the driven shaft 71 idle as far as driving is concerned until the next gear shift.

The operation is readily understood. The inactive or clutch-in position of the clutch pedal 3 occurs when there is no foot pressure upon it (Fig. 1). The transmission release disk 82 is then farthest to the rear (Fig. 5). The unshown shifting mechanism is understood to be standing in neutral, and this adjustment is responsible for the so-indicated position of the shifter disk 86 (Fig. 5).

The one gear shift taken for example herein is the shift to reverse. The clutch pedal 3 is pressed down (Fig. 3). The clutch is disengaged by the resulting movements of the rack bar 6 and gear 16 in the directions of the arrows *a* and *b*. Obviously the clutch fork 26 will be in the clutch-out position (Fig. 2). The position of the shifter disk 86 is unaffected as yet, the right end of the slot 28 being supposed to have just caught up with the stud 29 on the link 30 (Fig. 2). A further depression of the clutch pedal 3 until it reaches the final position in Fig. 3, causes the right end of the slot 28 to pull upon the link 30, displacing the transmission release disk 82 to the clutch-out position. The clutch fork 26 merely moves slightly beyond the clutch-out position.

The foregoing displacement of the transmission release disk 82 carries the attached gear release bars 84 to the left, superimposing the solid parts of these bars adjacent to the long inclines 106 upon the cross pins 116. The keys 112 are thus held retracted in the recesses 93, and the shifter bars 85 are free to be shifted back and forth to make the gear selection. The selection upon which this description is predicated is that of reverse gear.

Said selection is made at the unshown shifting mechanism and the adjustment is to reverse. The resulting effect upon the shifting bar 62 (Figs. 1 and 4) is a forward pull. This results in moving the shifter disk 86 (Fig. 5) from the indicated neutral position one step to the left where it is stopped by the headed studs 79. The shifter bar notches 110 will now be directly over the cross pins 116. Foot pressure is relaxed gradually from the pedal 3. The spring 27 causes the linkage 17, 21 to return toward the starting position (Fig. 1). The spring 34 (Fig. 4) causes the release disk 82 to return toward the clutch-in position (Fig. 5). As said disk moves toward said position the inclines 106 of the notches 104 gradually let the cross pins 116 move outwardly under the influence of the springs 114. When the sets of notches 104, 110 are in full registration, the keys 112 will have extended to their limits in the recesses 117, thereby locking the gear center 91 to the reverse gear 97.

The final stage of relaxation of foot-pressure on the pedal 3, after the registration of the notches 104, 110 has been completed, enables the linkage 17, 21 to complete the engagement of the clutch by means of the fork 26, the independent operation here being due to the movement of the slot 28 with respect to the now stationary stud 29 until the original relationship (Fig. 1) is restored.

As the pedal is permitted to gradually elevate and the clutch is correspondingly let in, the operator will tilt the pedal 3 forwardly on the pivot pin 5 (dotted lines Fig. 3) causing an acceleration of the motor by the operation of the throttle linkage. The accelerator rod 10 is thus capable of actuation by the pedal 3 simultaneously as the latter lets in the clutch.

The reverse gear 97 is to be considered as representative of the remaining speed-change gears. The foregoing sequences of operation are identical in principle with those already described when a gear selection other than that of reverse gear is made. The locking means to lock the selected gear 97 to the driven shaft 71 mainly comprises the keys 112, but the gear center 91 and the registrable recesses 93, 117, are essential elements.

From what has been stated, it will be understood that gear-neutralization can be accomplished in two ways, first by shifting the bar 85 to neutral by adjusting the shifting mechanism to neutral, second by shifting the bar 84 to neutral upon moving the clutch operating means into and past the clutch-out position. It is in the clutch letting-in act of the pedal 3 that the accelerator is actuated; the first part of said act shifts the bars 84 to the right to enable locking of the gear center 91 to the gear 97, the second part of said act actually causing engagement of the clutch so that driving power is delivered to the shaft 71.

I claim:

1. In transmission mechanism, speed-change gears and locking means to lock a selected gear to a driven shaft, means which is subject to a clutch operating means for neutralizing all of the locking means when said clutch operating means is in a clutch-out position, said clutch operating means including a pedal, a vehicle foot-board having a pocket occupied by the pedal and in which the pedal is movable, and an accelerator rod extending into the pocket and capable of actuation by the pedal simultaneously as said pedal controls the clutch operating means.

2. In transmission mechanism, speed-change gears and locking means to lock a selected gear to a driven shaft, a clutch-operating means which in its operation is adapted to place a clutch into either clutch-in or clutch-out positions, means which plays over the locking means and is adapted to neutralize all of said locking means when said clutch operating means is in a clutch-out position, said clutch operating means including a pedal, and an accelerator rod extending into the path of movement of the pedal so as to be operable for an acceleration simultaneously as the pedal controls the clutch operating means.

3. In transmission mechanism, a speed-change gear and locking means to lock said gear to a driven shaft, an element which in moving relatively to the locking means is capable of either neutralizing the locking means so that said gear becomes still, or causing it to lock the gear and driven shaft together so that the gear revolves, clutch-operating means which when worked preparatory to letting in a clutch also moves said element to enable the locking means to gradually engage and lock the gear, said clutch-operating means including a pedal which is movable independently of the rest of said means and an accelerator rod in the path of said pedal and thereby capable of independent actuation solely by said pedal to cause a motor acceleration after the clutch has been let in.

4. In transmission mechanism, a speed-change gear, locking means to lock said gear to a driven shaft, an element that controls said locking means, either making the locking means lock the gear to said shaft so that the gear is rotated or neutralizing the locking means so that the gear becomes still, motor-clutch operating means to engage and disengage a clutch so as to drive or stop said shaft, delayed-motion means connected between the clutch-operating means and said element to make said element pause in neutralizing the locking means until after the clutch-operating means disengages the clutch and to cause a pause in the reengagement of the clutch until after said element has made the locking means relock the gear to the shaft, and an accelerator rod which is adapted to be operated by a part of the clutch-operating means to accelerate the motor as said means lets in the clutch.

5. In transmission mechanism, a speed-change gear, locking means to lock said gear to a driven shaft, an element that controls said locking means, either making the locking means lock the gear to said shaft so that the gear is rotated or neutralizing the locking means so that the gear becomes still, motor-clutch operating means to engage and disengage a clutch so as to drive or stop said shaft, means coupled between the clutch-operating means and said element to make neutralization of the locking means lag behind disengagement of the clutch and to make clutch-reengagement lag behind reengagement of the locking means, and an accelerator rod which is adapted to be operated by a part of the clutch-operating means as said means causes reengagement of the clutch.

6. In transmission mechanism, speed-change gears and locking means to lock a selected gear to a driven shaft, clutch-operating means including a foot pedal by which the shaft is started and stopped, means under control of said clutch-operating means to correspondingly render said locking means operative and inoperative to suit the driven and stopped conditions of said shaft, and an accelerator rod situated in proximity to the foot pedal so that said rod can be worked by the pedal irrespective of the functioning of the pedal in operating the clutch to start and stop the shaft.

7. In transmission mechanism, speed-change gears of which any one is selective to drive a driven shaft, clutch-operating means to start and stop said shaft with respect to any gear selection, said means including a pedal, an element which reciprocatively and turnably carries the pedal, the reciprocation of said element and the pedal working the clutch, and an accelerator rod extending into proximity to the pedal and subject to be moved by the independent turning of the pedal on said element.

8. In transmission mechanism, a foot-board having a pedal pocket, said pocket including a floor, clutch-operating means including a bar projecting through the floor into the pocket, an accelerator rod projecting through the floor into the pocket, guide means for the respective rods depending from said floor, and a pedal wholly contained by the pocket having means by which it is pivotally mounted upon the rod of the clutch-operating means, so that a free portion thereof is superimposed upon the accelerator rod.

ROLLIE R. EASTIN.